T. M. COLLINS.
Ore Washer.
No. 7,361. Patented May 14, 1850.
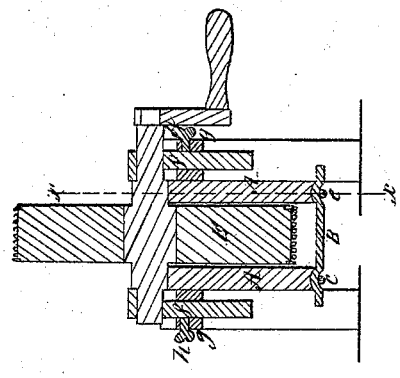
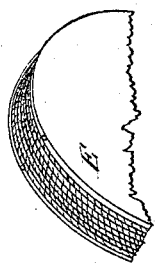
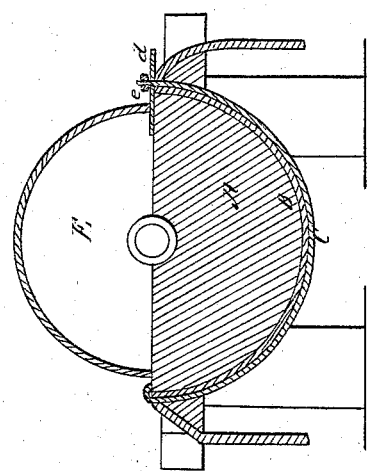
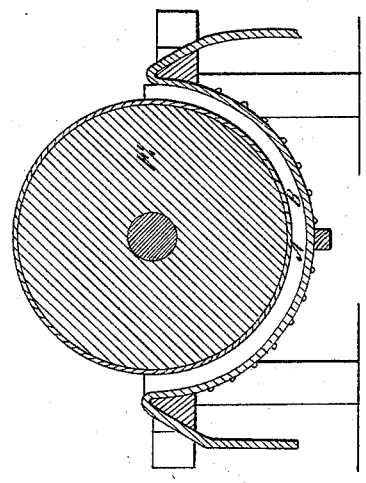

UNITED STATES PATENT OFFICE.

THOS. M. COLLINS, OF MARION, ARKANSAS.

CYLINDER AND TROUGH GOLD-WASHER.

Specification of Letters Patent No. 7,361, dated May 14, 1850.

*To all whom it may concern:*

Be it known that I, THOS. M. COLLINS, of Marion, in the county of Crittenden and State of Arkansas, have invented a new and Improved Machine for Washing and Separating Gold from all other Minute or Pulverized Substances; and I do hereby declare the following to be a full and exact description thereof, reference being had to the accompanying drawings, making a part of this specification. Figure 1, is a vertical transverse section through the center of my gold washer; Fig. 2, a vertical longitudinal section in the line $x, x$, of Fig. 1, and Fig. 3, a perspective view of a broken detached portion of the machine. Fig. 4, is a vertical longitudinal section through the center of a gold washer slightly different in construction from that represented by Figs. 1 and 2.

Similar letters indicate like parts in all the figures.

My improved gold washer is composed of a trough, having a bottom made of raw hide, leather, or some fibrous manufacture, and a wheel placed within the said trough, having its periphery wound with rope, or covered with some other fibrous material.

A, A, are the sides of the trough, placed and properly secured within any suitable supporting frame; B, is the bottom of the trough, which I generally construct of raw hide. The bottom of the trough may be secured to the sides thereof by means of grooves formed in their semi-peripheries and the strong wires $c, c$, placed therein; one end of each of which wires is made fast at one end of the groove in which it is placed, and its other end passes through a hole in the plate $d$, made fast at the opposite end of the groove, and has a screw cut thereon which receives the nut $e$, that serves to draw the wire firmly into the groove in which it is placed. So that when the edges of the material forming the bottom of the trough have been inserted between the grooves in the edges of its sides, and the tension wires $c, c$, they can be firmly secured by turning the nuts $e$, upon the wires. The flexible bottom of the trough may be nailed to its sides, as shown in Fig. 4, or secured thereto in any other suitable manner.

The journals of the axle of the wheel E, are placed in the adjustable bearing boxes $f, f;$ which bearing boxes are inserted into mortices in the side pieces $g, g$, of the frame, and they are secured in any desired position by the set screws $h, h$, as represented in Fig. 1; by which means the periphery of the wheel can be elevated any desirable distance above the bottom of the trough.

The operation of my gold washer is as follows; the earthy or other gold bearing substance being placed in the trough and water admitted thereto, motion is imparted to the wheel, at first slowly, for the purpose of thoroughly mixing the earthy substance with the water; and when this is accomplished, a rapid motion is imparted to the wheel which causes it to speedily empty the trough of the water and every substance lighter than the gold, and leaves the gold in the bottom of the trough. I also intend to operate my gold washer in the following manner: to wit; permit a stream of water to flow into the trough, and continuously supply it with the gold bearing substance while a continuous motion is imparted to the wheel. The object of making the bottom of the trough of leather, raw hide, or some fibrous manufacture is to enable the particles of gold to adhere to it. The object of covering the periphery of the wheel with cordage or other absorbent or fibrous material, is to enable it to take up a larger quantity of the water and the earthy matter mixed therewith, than if the covering was not employed and thereby enable it to throw off the same by centrifugal force with great rapidity when the wheel is revolved.

What I claim as my invention and desire to secure by Letters Patent, is—

The separating gold or other heavy substances from others of less specific gravity and water with which it may be mingled, by the use of a wheel or cylinder and trough; the periphery of the former and the bottom of the latter being covered and constructed substantially in the manner herein set forth.

THOS. M. COLLINS.

Witnesses:
Z. C. ROBBINS,
R. W. FENWICK.